Feb. 17, 1970 T. S. NISBET ET AL 3,495,889
ROLLING ELEMENT BEARING
Filed May 21, 1968 4 Sheets-Sheet 3

THOMAS S. NISBET,
COLIN W. FOOT,
RONALD A. CLARKE,
INVENTORS

BY
ATTORNEY

Feb. 17, 1970 T. S. NISBET ET AL 3,495,889
ROLLING ELEMENT BEARING
Filed May 21, 1968 4 Sheets-Sheet 4
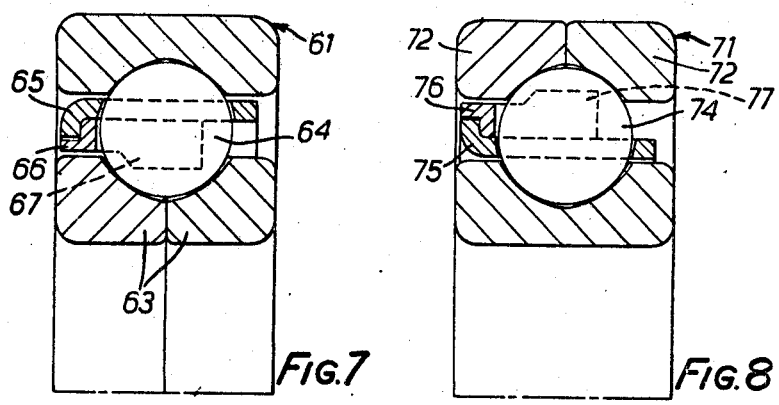
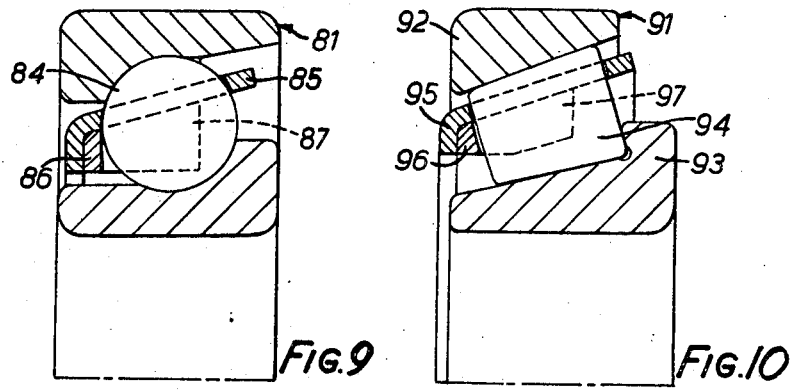
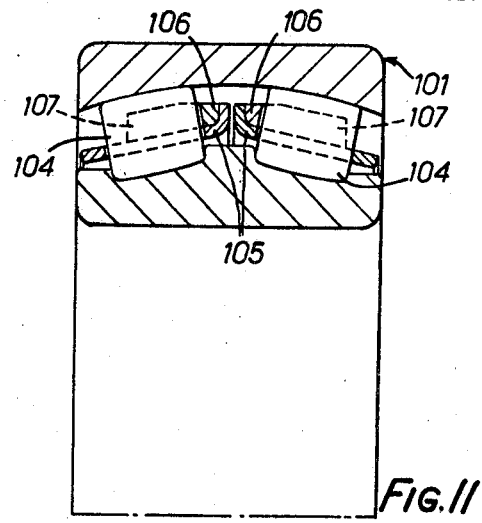
THOMAS S. NISBET.
COLIN W. FOOT,
RONALD A. CLARKE,
INVENTORS
BY *Hallr Hmyhts*
ATTORNEY United States Patent Office 3,495,889
Patented Feb. 17, 1970

3,495,889
ROLLING ELEMENT BEARING
Thomas Stewart Nisbet, Colin Wesley Foot, and Ronald Arthur Clarke, Chelmsford, England, assignors to The Hoffmann Manufacturing Company Limited, Chelmsford, Essex, England, a British company
Filed May 21, 1968, Ser. No. 730,738
Claims priority, application Great Britain, May 25, 1967, 24,331/67
Int. Cl. F16c 19/20, 33/00, 33/46
U.S. Cl. 308—213                                                        8 Claims

ABSTRACT OF THE DISCLOSURE

A pressed metal cage is used to separate the rolling elements of a rolling element bearing and retain them in one radial direction. Retention of the rolling elements in the other radial direction is provided by inserting a circular comb retaining device into the bore of the bearing.

BACKGROUND OF THE INVENTION

According to the present invention means for supporting and retaining rolling elements in a bearing include an annular cage formed with pockets for supporting each of the rolling elements against movement in a radial direction with respect to the longitudinal axis of the cage, each of the rolling elements being retained against movement in the opposite radial direction by a retaining device in the form of a ring having a plurality of teeth extending therefrom in the direction of the axis of the ring and between the rolling elements, the retaining device having the same number of teeth as the bearing has rolling elements, the retaining device being formed with surfaces which in use co-operate with the cage and rolling elements, the intercooperation of the retaining device, cage and rolling elements being such that the retaining device is restrained against movement in the direction of the longitudinal axis of the cage.

Throughout this specification this retaining device will be referred to as a "circular comb retaining device."

SUMMARY OF THE INVENTION

According to the present invention means for supporting and retaining rolling elements in a bearing include a cylindrical cage formed with pockets for supporting each of the rolling elements against movements in a radial direction with respect to the longitudinal axis of the cage, and means for retaining each of the rolling elements against movement in the opposite radial direction, the retaining means comprising a device or devices formed with surfaces shaped to co-operate with the cage and the rolling elements in such a manner that the device or devices is or are restrained against movement in the direction of the longitudinal axis of the cage. The pockets of the cage are located either inside or outside the pitch circle of the rolling elements while the retaining means is also located either inside or outside the pitch circle of the rolling elements but on the opposite side to the pockets.

In a preferred embodiment the cage is of L section, the pockets being formed in the cylindrical portion thereof, and the retaining means is constituted by a device in the form of a ring having a plurality of teeth extending therefrom in the direction of the axis of the ring and between the rolling elements, the device having the same number of teeth as the bearing has rolling elements. This retaining device will be referred to as a circular comb retaining device.

In another embodiment the retaining means is constituted by a ring situated on one side of the rolling elements and provided with lips protruding over or under the rolling elements, and by prongs situated on the other side of the rolling elements and integral with the cage. A modification of this embodiment has the retaining means constituted by two rings, each ring being situated on one side of the rolling elements and provided with lips protruding over or under the rolling element.

In a preferred embodiment the cage is of L section, the pockets being formed in the annular portion thereof.

Snapping in of the rolling elements may be facilitated by constructing the circular comb retaining device from a sufficiently resilient material which may be moulded or machined, such as nylon. Snapping in may be further facilitated by forming the teeth of the circular comb with relief notches formed axially along the teeth.

Advantageously the circular comb retaining device is arranged to provide a continuous rubbing contact with the rolling elements, the retaining device being constructed from a material that provides film lubrication.

Advantageously the edges of the pockets formed in the cage itself should be coined to provide a satisfactory rubbing surface with the rolling elements. Alternatively the edges of the cages pockets may be bent to provide wings to give satisfactory rubbing contact with the surfaces of the rolling elements. Moreover the teeth of the retaining device may be profiled to accommodate the adjacent surfaces of the rolling elements.

Preferably the teeth of the circular comb retaining device extend radially beyond the bore of the solid ring portion of the retaining device so that snapping in of the rolling elements is facilitated.

In further arrangements, a duplex ball bearing or an angular contact ball bearing or a tapered roller bearing or a double row spherical roller bearing may be provided with supporting and retaining means embodying the invention.

BRIEF DESCRIPTION OF THE DRAWINGS

Several embodiments of the invention will now be described in greater detail, by way of example with reference to the accompanying drawings in which:

FIGURE 7 shows a duplex ball bearing with two-piece inner ring having a simple pressed metal cage with a comb shaped retaining device inserted into its bore;

FIGURE 8 shows a duplex ball bearing with two-piece outer ring having a simple pressed metal cage with a comb shaped retaining device fitted over the cage body;

FIGURE 9 shows an angular contact-ball bearing fitted with a pressed metal cage with a comb shaped retaining device inserted in the cage body;

FIGURE 10 shows a tapered roller bearing with separable rings, fitted with a pressed metal cage having a comb shaped retaining device inserted in the cage body; and FIGURE 11 shows a double row spherical roller bearing having simple pressed metal cages with a comb shaped retaining device fitted over each cage body.

DESCRIPTION OF THE PREFERRED EMBODIMENTS

Figure 1:
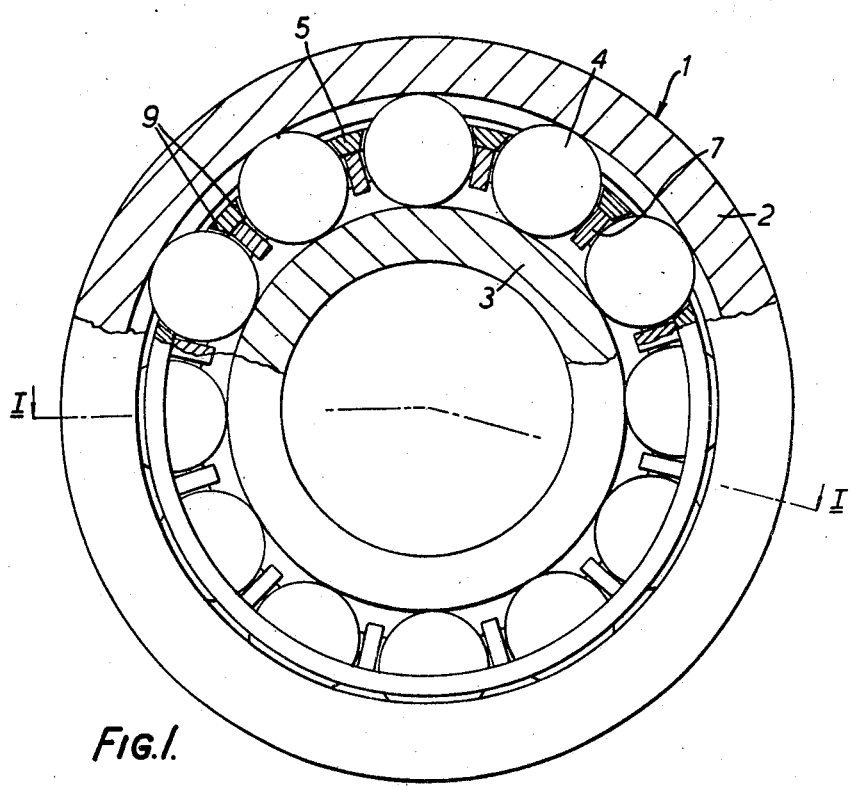
FIGURE 1 shows a view along the axis of a cylindrical roller bearing partly in section.
Figure 2:
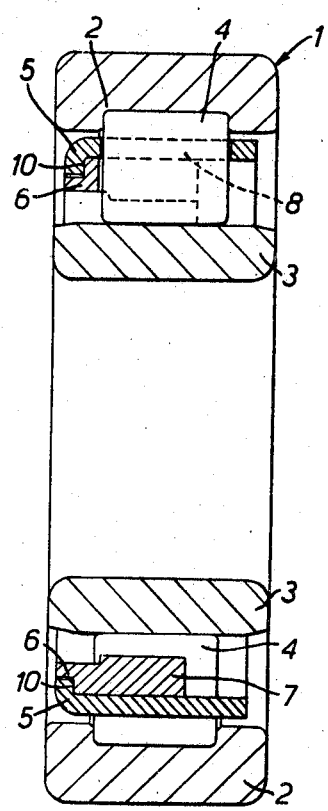
FIGURE 2 shows a section of FIGURE 1 taken through the line I—I.

Referring to FIGURES 1 and 2, a cylindrical roller bearing 1 has an outer ring 2 and a separable inner ring 3. Rollers 4 are held in position during assembly or disassembly by means of a simple pressed metal cage 5 of L section and a retaining device 6, of circular comb shape and made from resilient material such as nylon having teeth 7. The cylindrical part of the cage 5 has pockets 8, and lies outside the pitch circle of the rollers 4, so that the rollers 4 are prevented from movement radially outwards. In the embodiment of FIGURES 1 and 2 the cage 5 is a simple metal pressing of L section and the edges 9 of the pockets 8 are coined to provide satisfactory contact surfaces for the rollers 4. The teeth 7 of the circular comb shaped retaining device 6 are of rectangular cross-section and extend inside the pitch circle of the rollers 4 so as to prevent movement of the rollers 4 radially inwards. The comb shaped device 6 is so formed that it co-operates at 10 with the metal cage 5 so that the cage 5 prevents the device 6 from movement in an axial direction to the left (FIGURE 2), and when the rollers are inserted they prevent the device 6 from movement in an axial direction to the right.

To assemble the roller bearing, the metal cage 5 is inserted into the outer ring 2 and the comb shaped retaining device is fitted in against the cage 5 (as shown at 10 in FIGURE 2). The rollers are then snapped into position between the resilient teeth 7, and the inner ring 3 is put into position. As can be seen from FIGURE 1, when the bearing 1 is assembled, the rollers 4 are held in position by the inner ring 3, the retaining device 6 being used for retaining the rollers only when the inner ring is in the disassembled position. Alternatively, the retaining device 6 can be assembled into the cage 5 before the cage itself is inserted into the outer ring 2.

The bore size inside the teeth 7 is smaller than the bore of the solid ring portion of the device 6. This, together with the resilient nature of the teeth 7 facilitates the snapping in of the rollers 4. The teeth 7 extend sufficiently across the length of the rollers to give positive retention during assembly or disassembly.

Figure 3:
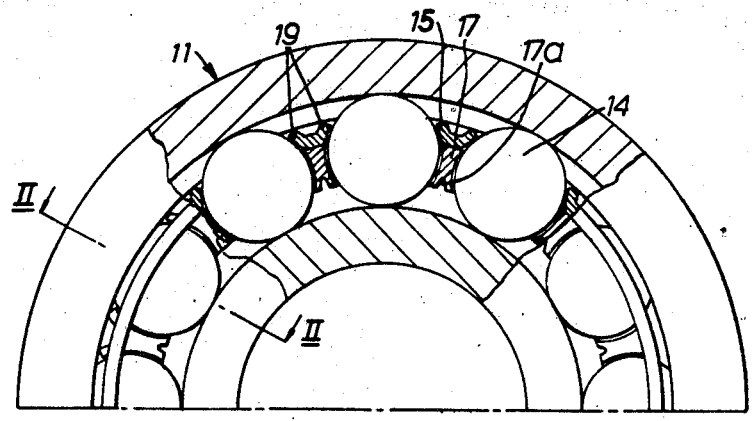
FIGURE 3 shows a view along the axis, partly in section, of a cylindrical roller bearing with a slightly different form of pressed metal cage, together with an alternative form of retaining device.
Figure 4:
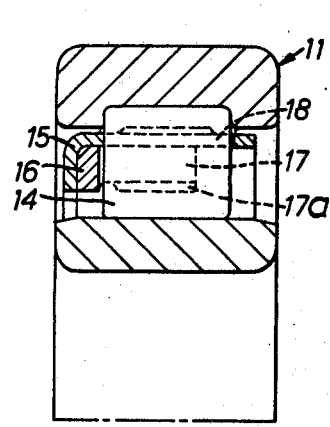
FIGURE 4 shows a section of FIGURE 3 taken through the line II—II.

The embodiment of FIGURES 3 and 4 shows a roller bearing 11 which is very similar to that shown in FIGURES 1 and 2, but the pressed metal cage 15 is constructed from material of smaller thickness than that of the corresponding part 5 of FIGURES 1 and 2, and the edges 19 adjacent the pockets 18 are bent outwardly so as to accommodate the curves of the rollers 14. The resilient teeth 17 of the retaining device 16 are shaped to accommodate the curves of the rollers and are formed with notches 17a at their inner extremities which serve to accentuate the resilience of the teeth and therefore to facilitate snapping in of the rollers 14 during assembly.

Figure 6:
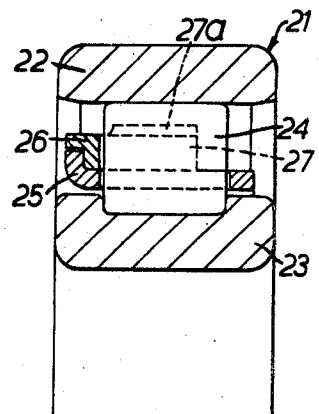
FIGURE 6 shows a section of FIGURE 5 taken through the line III—III.
Figure 5:
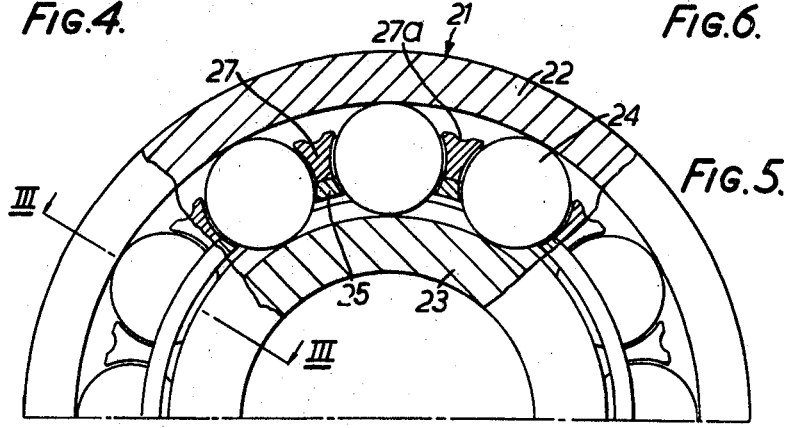
FIGURE 5 shows a view along the axis, partly in section, of a cylindrical roller bearing with separable outer ring.

The embodiment of FIGURES 5 and 6 shows a cylindrical roller bearing 21 having a separable outer ring 22 and an inner ring 23. In other respects the bearing is very similar to the bearing of FIGURES 1 and 2, the rollers 24 being retained by the cage 25 in one direction. The teeth 27, however, are shaped similar to the teeth 17 of the embodiment of FIGURES 3 and 4, and have notches 27a at their outer extremities. In this embodiment the retaining device 26 is designed to give retention of the rollers 24 in an outward direction, and the diameter over the teeth 27 is larger than the diameter of the solid ring portion of the device 26. In a similar manner to that described above in connection with the embodiment of FIGURES 1 and 2, this extension of the teeth 27 beyond the diameter of the solid ring portion of the device 26, facilitates the snapping in of the rollers 24.

FIGURE 7 shows another embodiment of the invention, in which in a duplex ball bearing 61, balls 64 take the place of the rollers 4, 14, 24, 34, 44, 54 of the previous embodiments respectively. The bearing which has a two-piece inner ring 63 is fitted with a pressed metal cage 65 of L section and has a comb shaped retaining device 66 having teeth 67 inserted in its bore. Similarly, FIGURE 8 shows a duplex ball bearing 71 having a two-piece outer ring 72, balls 74, a simple pressed metal cage 75 and a comb shaped retaining device 76, having teeth 77.

FIGURE 9 shows an angular contact ball bearing 81, with balls 84, a pressed metal cage 85 and a comb shaped retaining device 86, having teeth 87. FIGURE 10 shows a tapered roller bearing 91 with separable rings 92, 93, tapered roller bearings 94, a pressed metal cage 95 and a comb shaped retaining device 96, having teeth 97. In FIGURE 11 is shown a double row spherical roller bearing 101 having two rows of roller elements 104, two simple pressed metal cages 105, a comb shaped retaining device 106, having teeth 107, being fitted over each cage body.

It will be seen that an advantage of the supporting and retaining means for the rolling elements of the rolling bearings described in the above embodiments of the invention, is that the bearing can be readily disassembled and reassembled without damage to the component parts. This allows the running tracks of the bearing to be examined and easily cleaned.

It will be understood that the invention is not limited to the specific embodiments described above, it being possible for example to use other materials than nylon for the retaining devices. Such materials should be inherently resilient and be capable of being moulded or machined. It is further possible to use for constructing the retaining devices a material which will act to lubricate the bearing elements.

What is claimed is:

1. A rolling element bearing comprising in combination:
    (a) an inner bearing ring;
    (b) an outer bearing ring;
    (c) a plurality of rolling elements;
    (d) an annular cage having an annular wall portion provided with a plurality of apertures; and
    (e) a resiliently deformable retaining device in the form of a ring having a plurality of teeth extending therefrom in the direction of the longitudinal axis of said cage, said device having the same number of teeth as said bearing has rolling elements; said retaining device co-operating with said cage and said rolling elements; each of said rolling elements being restrained against movement in a radial direction with respect to said longitudinal axis of said cage by that part of said cage defining a corresponding one of said apertures; said rolling elements being restrained against movement in a second radial direction with respect to said longitudinal axis of said cage by said teeth of said retaining device; and said co-operation of said retaining device, said cage and said rolling elements restraining said retaining device against movement in the direction of said longitudinal axis of said cage.

2. A rolling element bearing according to claim 1, in which said cage is of L section.

3. A rolling element bearing according to claim 1, in which said teeth of said retaining device are shaped to accommodate the curves of the adjacent rolling elements.

4. A rolling element bearing according to claim 1 in which said teeth of said retaining device have distal ends provided with notches therein.

5. A rolling element bearing according to claim 1, in which said retaining device is arranged to provide continuous rubbing contact with said rolling elements, said retaining device being constructed from a material that provides film lubrication.

6. A rolling element bearing according to claim 1, in which those parts of said cage defining said apertures are formed as tapering edges.

7. A rolling element bearing according to claim 1, in which portions of said cage are upset to define said apertures.

8. A rolling element bearing according to claim 1, in which said teeth of said retaining device extend radially beyond the bore of said ring portion of said retaining device.

References Cited
UNITED STATES PATENTS

| | | | |
|---|---|---|---|
| 1,358,848 | 11/1920 | Hindle et al. | 308—217 |
| 1,887,176 | 11/1932 | Young | 308—217 |
| 1,911,544 | 5/1933 | Beard | 308—217 |
| 2,950,151 | 8/1960 | Clark et al. | 308—217 |
| 1,940,124 | 12/1933 | Gibbons | 308—217 |
| 3,051,534 | 8/1962 | Kohler et al. | 308—217 |

MARTIN P. SCHWADRON, Primary Examiner

FRANK SUSKO, Assistant Examiner

U.S. Cl. X.R.
308—217